United States Patent Office 2,931,699
Patented Apr. 5, 1960

2,931,699

PROCESS FOR PRINTING TEXTILES AND PRINTING PREPARATIONS THEREFOR

Eduard Moser, Basel, and Albert Bolleter, Muttenz, Switzerland, assignors to Ciba Limited, Basel, Switzerland, a Swiss firm No Drawing. Application October 7, 1957
Serial No. 688,398

Claims priority, application Switzerland October 18, 1956

1 Claim. (Cl. 8—71)

The present invention is based on the observation that valuable prints on textiles can be produced by printing on the textile a coupling component and a stabilized diazo-compound followed by development of the dyestuff under neutral conditions such as by steaming with neutral steam, if there is used a printing preparation which contains as coupling component a 4-arylazo-1-amino-7-hydroxynaphthalene free from groups imparting solubility in water and as stabilized diazo-compound a diazoamino-compound of the formula (1) 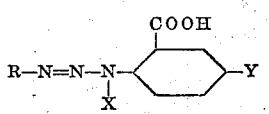

in which R represents an at most bicyclic aryl radical free from groups imparting solubility in water, X represents a hydrocarbon radical which may contain a group imparting solubility in water, and Y represents a hydrogen atom or a sulfonic acid group.

As examples of 4-arylazo-1-amino-7-hydroxynaphthalenes there bay be mentioned, for example, 4-α-naphthylazo-1-amino-7-hydroxynaphthalene, and especially 4-arylazo-1-amino-7-hydroxynaphthalenes of the formula (2) 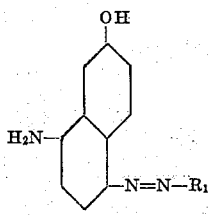

in which R₁ represents a napthalene radical which may be substituted or advantageously a benzene radical. The coupling components of the Formula 2 can be made by methods in themselves known, for example, by coupling 1-amino-7-hydroxynaphthalene in a strong to weakly acid medium with a diazotized aminonaphthalene or aminobenzene derivative, such as α-Naphthylamine,
6-methoxy-2-aminonaphthalene,
2-nitro-1-aminobenzene,
2-methoxy-5-chloro- or -4-nitro-1-aminobenzene,
2-methyl-4-chloro- or -4-nitro-1-aminobenzene,
2:5-dimethoxy-4-benzoylamino-1-aminobenzene,
2-chloro-5-trifluoromethyl-1-aminobenzene,
2-nitro-4-methoxy-1-aminobenzene,
2:5-dichloro-1-aminobenzene,
2:5-dimethoxy-4-nitro-1-aminobenzene,
2-methoxy-4-chloro-5-methyl-1-aminobenzene,
2:5-dimethoxy-4-chloro-1-aminobenzene,
2-nitro-4-methyl- or 2:5-dinitro-1-aminobenzene and 2-methyl- or 2-methoxy-1-aminobenzene-5-sulfonic acid amides, such as 2-methyl-1-aminobenzene-5-sulfonic acid diethylamide.

The diazoamino-compounds to be used with the aforesaid coupling components for making the printing preparations to be used in the process of this invention can be obtained by methods in themselves known, for example, by condensing a diazotized at most bicyclic aromatic base, which is free from groups imparting solubility in water, with an aminobenzene carboxylic acid of the formula (3) 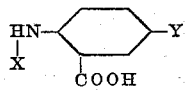

in which Y represents a hydrogen atom or a sulfonic acid group, and X represents a hydrocarbon radical which may contain a group imparting solubility in water, especially a carboxylic acid group. As such hydrocarbon radicals there may be mentioned, for example, methyl, ethyl, propyl, benzyl, isopropyl and isobutyl groups, and also the radicals of carboxylic acids, for example, the radical —CH₂CH₂COOH or

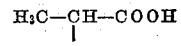

As examples of compounds of the Formula 3 there may be mentioned:

1-methylaminobenzene-2-carboxylic acid-4-sulfonic acid,
1-benzylaminobenzene-2-carboxylic acid-4-sulfonic acid,
1-ethylaminobenzene-2-carboxylic acid-4-sulfonic acid,
1-isopropylaminobenzene-2-carboxylic acid - 4-sulfonic acid,
1-butylaminobenzene-2-carboxylic acid-4-sulfonic acid,
1-isobutylaminobenzene-2-carboxylic acid-4-sulfonic acid,
α-(2-carboxyphenylamino)-propionic acid,
α-(2-carboxyphenylamino)-butyric acid,
α-(2-carboxyphenylamino)-valeric acid,
α-(2-carboxyphenylamino)-β-methylbutyric acid and
α-(2-carboxyphenylamino)-phenyl-acetic acid.

As diazo-compounds to be condensed with the aforesaid compounds of the Formula 3 there may be mentioned, for example, the diazo-compounds obtainable by methods in themselves known from the following aromatic bases:

α-Naphthylamine and especially 2:5-dichloroaniline,
2:5-dimethoxy- or 2-methyl-5-chloraniline,
2-methoxy- or 2-methyl-4-nitroaniline,
2:5-dimethoxy-4-benzoylamino-1-aminobenzene,
2:5-diethoxy-4-benzoylamino-1-aminobenzene,
2-methoxy-5-methyl-4-benzoylamino-1-aminobenzene,
1-aminobenzene-3-sulfonic acid piperidide,
1-amino-2-methoxybenzene-5-sulfonic acid diethylamide,
1-amino-2-methylbenzene-5-sulfonic acid diethylamide,
1-amino-2-methylbenzene-5-sulfonic acid dimethylamide,
1-amino-2-methylbenzene-5-sulfonic acid morpholide,
1-amino-2-methyl- or -methoxybenzene-5-sulfonic acid piperidide.

The condensation is advantageously carried out in an alkaline medium, and the alkali metal salts of the diazoamino-compounds so obtained can easily be isolated by methods in themselves known, for example, by salting out or by subjecting solutions thereof, if desired, after filtering them, to a rapid drying operation.

The printing preparations are prepared from the aforesaid components with the solvents and thickening agents usual for such preparations. Advantageously, there are used in the process of this invention printing preparations of the aforesaid kind, which contain free alkali metal hydroxide, for example, sodium hydroxide or potassium hydroxide.

By the process of this invention fabrics or mixed fabrics, especially those of cellulose fibers, are printed by known methods, for example, by screen printing or roller printing. Strong prints are obtained by steaming with neutral steam and also in most cases by steaming with acid steam. In many cases the printed fabrics, which have been dried in the usual manner, can also be developed by heating them at a temperature above 100° C., and advantageously 130–150° C. This heating may be carried out, for example, in chambers heated electrically or by other means, and without supplying steam. For this purpose a small proportion of a hydrophilic substance, for example, glycerine must be added to the printing paste.

methods white or colored reserves can be produced on materials dyed in the manner described above.

In many cases the printing yield can be somewhat improved if, before drying, the printed material is treated for 30–60 seconds in a bath, especially an acid bath, containing bichromate, for example in a bath containing per liter, 2 grams of sodium bichromate and 3–5 grams of acetic acid of 40% strength. This treatment is especially advantageous when the printing paste has been allowed to stand for quite some time.

The following examples illustrate the invention, the parts and percentages being by weight:

*Example 1*

In this example there are used the following printing colors of which 100 parts have the following compositions:

| | Diazoamino-compound obtained from— | | Titre, percent | Parts | Coupling Component | Parts | Sodium sulfate | Sodium diisopropyl-naphthalene sulfonate | Tint of print so obtained |
|---|---|---|---|---|---|---|---|---|---|
| | Base | Stabiliser | | | | | | | |
| A | 1-Amino-2-methoxy-4-nitrobenzene. | 1-isobutylamino-benzene-2-carboxylicacid-4-sulfonic acid. | 60 | 64.0 | 1:7-aminonaphthol-4:1'-azo-2'-methoxy-5'-chlorobenzene. | 27.8 | 7.2 | 1.0 | dark olive. |
| B | ___do___ | ___do___ | 60 | 62.0 | 1:7-aminonaphthol-4:1'-azo-2':5'-dichlorobenzene. | 27.3 | 9.7 | 1.0 | reddish black. |
| C | 1-Amino-2-methoxy-5-chlorobenzene. | 1-ethylaminobenzene-2-carboxylicacid-4-sulfonic acid. | 60 | 58.5 | 1:7-aminonaphthol-4:1'-azo-2'-methoxy-4'-nitrobenzene. | 28.7 | 11.8 | 1.0 | black. |
| D | 1-Amino-2-methyl-4-nitrobenzene. | α-(2-carboxyphenyl)-aminovaleric acid. | 50 | 67.2 | ___do___ | 28.4 | 3.4 | 1.0 | brownish black. |
| E | 1-Amino-2-methoxybenzene-5-sulfonic acid morpholide. | 1-Isobutylaminobenzene-2-carboxylic acid-4-sulfonic acid. | 58 | 65.5 | ___do___ | 23.2 | 10.3 | 1.0 | black. |
| F | 1-Amino-2-methyl-benzene-5-sulfonic acid diethylamide. | 1-isopropylaminobenzene-2-carboxylic acid-4-sulfonic acid. | 63 | 62.1 | 1:7-aminonaphthol-4:1'-azo-2'-methly-4'-chlorobenzene. | 23.8 | 13.1 | 1.0 | grey brown. |
| G | 1-Amino-2-methoxy-5-chlorobenzene. | 1-ethylaminobenzene-2-carboxylic acid-4-sulfonic acid. | 60 | 60.6 | 1:7-aminonaphthol-4:1'-azo-2'-methyl-4'-nitrobenzene. | 28.4 | 10.0 | 1.0 | brownish black. |
| H | 1-amino-2-methyl-5-chlorobenzene. | ___do___ | 55 | 62.9 | 1:7-aminonaphthol-4:1'-azo-2'-methoxy-4'-chloro-5'-methylbenzene. | 29.8 | 6.3 | 1.0 | olive brown. |
| J | 1-Amino-2-methoxy-5-chlorobenzene. | ___do___ | 60 | 58.0 | 1:7-aminonaphthol-4:1'-azo-2':5'-dimethoxy-4'-nitrobenzene. | 29.6 | 11.4 | 1.0 | black. |
| K | 1-Amino-2-methyl-4-nitrobenzene. | α-(2-carboxyphenyl)-aminovaleric acid. | 50 | 67.5 | 1:7-aminonaphthol-4:1'-azo-2'-methyl-4'-chlorobenzene. | 26.4 | 5.1 | 1.0 | dark brown. |
| L | 1-Amino-2:5-dichlorobenzene. | α-(2-carboxyphenyl)-aminophenylacetic acid. | 48 | 69.7 | 1:7-aminonaphthol-4:1'-azo-2':4'-dinitrobenzene. | 26.9 | 2.4 | 1.0 | brown. |
| M | 1-Amino-2-chloro-5-trifluoromethylbenzene. | α-(2-carboxyphenyl)-amino-β-methylbutyric acid. | 48 | 67.2 | 1:7-aminonaphthol-4:1'-azo-2'-nitro-4'-chlorobenzene. | 25.0 | 6.8 | 1.0 | violet brown. |
| N | 1-Amino-2-methoxy-5-chlorobenzene. | 1-ethylaminobenzene-2-carboxylic acid-4-sulfonic acid. | 60 | 63.0 | 1:7-aminonaphthol-41:'-azo-naphthalene. | 28.6 | 7.4 | 1.0 | brownish black. |
| O | 1-Amino-2-methyl-benzene-5-sulfonic acid-diethylamide. | ___do___ | 82 | 45.9 | 1:7-aminonaphthol-4:2'-azo-6'-methoxynaphthalene. | 25.9 | 27.2 | 1.0 | olive brown. |

Solutions obtained by replacing by water 70–100% of the thickening agent present in a printing paste can be used for padding fabrics or mixed fabrics, especially those of cellulose fibers, by the customary methods, for example, on a 2-roller foulard. The dyed fabrics are then dried at 50–60° C. and, as described above for printing, subsequently developed by neutral or acid steaming or by dry heat treatment at a temperature above 100° C.

By using the customary preprinting or over-printing

With the above printing colors there are prepared printing pastes having the following compositions:

| | A | B | C | D | E | F | G | H | J | K | L | M | N | O |
|---|---|---|---|---|---|---|---|---|---|---|---|---|---|---|
| Printing color | 100 | 120 | 100 | 120 | 120 | 120 | 120 | 80 | 120 | 120 | 120 | 120 | 120 | 120 |
| Alcohol (denatured) | 50 | 80 | 80 | 60 | 60 | 80 | 60 | 50 | 80 | 60 | 60 | 60 | 80 | 80 |
| Turkey Red oil | | | | 40 | 40 | | 40 | | | 40 | 40 | 40 | | |
| Urea | 30 | 30 | 50 | 30 | 30 | 50 | 50 | | 50 | 30 | 30 | 30 | 30 | 30 |
| Sodium hydroxide solution of 30% strength | 25 | 30 | 30 | 25 | 25 | 30 | 30 | 25 | 30 | 30 | 30 | 30 | 30 | 25 |
| Water | 325 | 270 | 280 | 255 | 255 | 250 | 230 | 295 | 250 | 250 | 250 | 250 | 270 | 285 |
| Neutral Starchtragacanth thickening | 450 | 450 | 450 | 450 | 450 | 450 | 450 | 530 | 450 | 450 | 450 | 450 | 450 | 450 |
| Sodium chlorate (solid) | 10 | 10 | | 10 | 10 | 10 | 10 | 10 | 10 | 10 | 10 | 10 | 10 | 10 |
| Turpentine oil | 10 | 10 | 10 | 10 | 10 | 10 | 10 | 10 | 10 | 10 | 10 | 10 | 10 | 10 |
| | 1,000 | 1,000 | 1,000 | 1,000 | 1,000 | 1,000 | 1,000 | 1,000 | 1,000 | 1,000 | 1,000 | 1,000 | 1,000 | 1,000 |

A cotton fabric is printed with the above printing pastes. The printed fabric is then dried at 50–60° C., and steamed neutral in a Mather-Platt steamer for 5–8 minutes at 100° C. The fabric is rinsed in the cold, and treated for 10 minutes at 40–50° C. with an enzyme preparation in order to remove the starch. It is again rinsed in the cold, soaped at the boil for 10 minutes, and dried after being rinsed again. There are obtained full pure prints. The same printing yield can generally be obtained by means of dry heat, for example, when the fabric, which has been printed and predried in the usual manner, is developed by heating it at a temperature above 100° C., advantageously within the range of 130° C. to 150° C., or by acid steaming for 2–5 minutes at 100° C., instead of neutral steaming. In many cases the printing yield can be somewhat improved by treating the printed material before it is dried for 30–60 seconds in a bath at 40° C. which contains, per liter, 2 grams of sodium bichromate and 3–5 grams of acetic acid of 40% strength.

The diazo-amino-compound used for preparing the printing paste F may be prepared as follows:

24.2 parts of 1-amino-2-methylbenzene-5-sulfonic acid diethylamide are diazotized in the usual manner in 45 parts of hydrochloric acid of 10% strength and 30 parts of ice with 6.9 parts of sodium nitrite in 25 parts of water. At the same time 28.5 parts of 1-isopropylamino benzene-2-carboxylic acid-4-sulfonic acid are dissolved in 200 parts of water with the equivalent quantity of sodium hydroxide solution of 30% strength, and 60 parts of potassium carbonate are added. When dissolution is complete, the whole is cooled to 0° C., and the filtered diazo-solution is introduced dropwise in the course of 20 minutes while stirring well. After a short time the diazo-amino-compound crystallizes out in fine lamellae and after 2 hours the coupling is complete. In order to complete the precipitation of the product 10 volumes percent of sodium chloride are added, the whole is stirred for a further hour, and then the well crystallized precipitate is filtered off with suction. It is washed with a small amount of saturated sodium chloride solution, pressed and dried in vacuo at 45–50° C.

The diazoamino-compound is obtained in good yield and has a content of 65–70% and is easily soluble in water.

The diazoamino-compound used for making the printing preparation E is obtained as follows:

A diazo-solution prepared in the usual manner from 27.2 parts of 1-amino-2-methoxybenzene-5-sulfonic acid morpholide of the formula

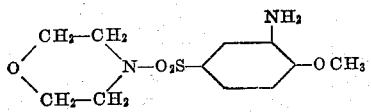

is added dropwise in the course of 20 minutes to a solution of 31.7 parts of the disodium salt of 1-isobutylamino-benzene-2-carboxylic acid-4-sulfonic acid, 2 parts of anhydrous sodium carbonate and 2 parts of sodium bicarbonate in 300 parts of water, cooled to 0 to −2° C. At the same time a sufficient quantity of sodium hydroxide solution of 30% strength is introduced dropwise to maintain the pH value of the mixture at 9.5 to 10. At the end the mixture is adjusted to a pH value of 10, filtered to remove a small amount of impurities and the solution is evaporated in a spray drier in which the inlet temperature of the air is between 130 and 180° C., and the outlet temperature is not less than 70° C. and not substantially higher than 100° C.

The fine yellowish powder so obtained has a content of about 50% of diazo-amino-compound. The yield amounts to 80 to 85% of the theoretical yield.

Example 2

A solution is prepared having the following composition:

| | Parts |
|---|---|
| Printing color C of Example 1 | 100 |
| Alcohol (denatured) | 80 |
| Urea | 50 |
| Sodium hydroxide solution of 30% strength | 30 |
| Neutral tragacanth thickening (80:1000) | 100 |
| Water | 640 |
| | 1000 |

A cotton fabric is padded with the above solution on a 2-roller foulard, and then squeezed and dried at 50–60° C. It is then steamed neutral for 5–8 minutes in a Mather-Platt steamer, rinsed in the cold, soaped at the boil for 10 minutes, again rinsed, and dried. There is obtained a full level black dyeing.

The same dyeing can also be produced by acid steaming for 2–5 minutes, instead of neutral steaming, or by heating the fabric for 5 minutes in an electrically heated chamber at 150° C.

Example 3

A white reserve can be produced by preprinting on a fabric dyed in accordance with Example 2, in the following manner:

A cotton fabric printed with a printing paste consisting of

| | |
|---|---|
| 600 parts | of a paste prepared from 274 parts of a powdered mixture of albumen, glue and gelatine and 326 parts of water |
| 10 parts | of calcined sodium carbonate |
| 130 parts | of water |
| 20 parts | of dimethyl-phenyl-benzylammonium chloride |
| 200 parts | of a mixture of 100 parts of zinc white and 100 parts of glycerine |
| 40 parts | of a mixture of 20 parts of titanium white and 20 parts of water |
| 1000 parts | |

The fabric is dried at 50–60° C. and then foularded with a solution of printing color C as described in Example 2. By the further treatment described in that example there is obtained a pure white effect on a black ground.

Example 4

The following printing pastes are printed side by side on a cotton fabric which has been padded as described in Example 2 and dried:

(a)

| | |
|---|---|
| 150 parts | of Ciba Scarlet G double extra paste (Color Index, 2nd edition, 1956, vol. II, page 2475, No. 73860) are stirred into |
| 700 parts | of a thickening of the composition given below, and then |
| 90 parts | of sodium formaldehyde-sulfoxylate and |
| 60 parts | of water are added |
| 1000 parts | |

(b)

| | |
|---|---|
| 90 parts | of Cibanone Brilliant Green BF paste conc. (Color Index, 2nd edition, 1956, vol. II, page 2519, No. 59825) are stirred into |
| 800 parts | of a thickening of the composition given below, and then |
| 80 parts | of sodium formaldehyde-sulfoxylate and |
| 30 parts | of water are added |
| 1000 parts | |

The thickening used in printing pastes (a) and (b) is prepared from

| | |
|---|---|
| 90 parts | of wheat starch |
| 90 parts | of cold water |
| 100 parts | of glycerine |
| 140 parts | of British gum powder |
| 170 parts | of tragacanth mucilage (60 :1000) |
| 170 parts | of potassium carbonate |
| 240 parts | of water |
| 1000 parts | |

The printed fabric is dried at 50–60° C., and then steamed neutral in a Mather-Platt steamer for 5–8 minutes at 100° C. The material is then rinsed in the cold, treated with an enzyme preparation for 10 minutes at 40-50° C. in order to remove the starch, then rinsed again, soaped at the boil for 10 minutes, rinsed again, and dried. There are obtained pure green and red prints on a black ground.

What is claimed is:

A printing preparation containing the 4-aryl-azo-1-amino-7-hydroxynaphthalene of the formula

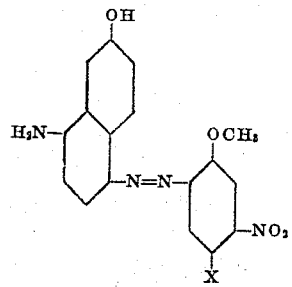

in which X represents a member selected from the group consisting of H and —OCH$_3$, and the labile diazoamino compound which in its free acid state corresponds to the formula

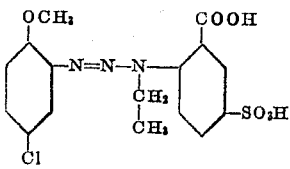

References Cited in the file of this patent
UNITED STATES PATENTS

| | | |
|---|---|---|
| 2,135,469 | Morschel | Nov. 1, 1938 |
| 2,781,337 | Moser | Feb. 12, 1957 |